(12) United States Patent
Yang

(10) Patent No.: US 11,365,993 B2
(45) Date of Patent: Jun. 21, 2022

(54) VENTURI FLOWMETER HAVING A REPLACEABLE TUBE INSERT AND RING ELEMENT INSERTED IN THE MAIN ORIFICE OF THE VENTURI

(71) Applicant: DAE HAN INSTRUMENT CO., LTD, Hwaseong-si (KR)

(72) Inventor: Jung Seung Yang, Daejeon (KR)

(73) Assignee: DAE HAN INSTRUMENT CO., LTD, Hwaseong-si (KR)

( * ) Notice: Subject to any disclaimer, the term of this patent is extended or adjusted under 35 U.S.C. 154(b) by 0 days.

(21) Appl. No.: 17/311,977

(22) PCT Filed: Oct. 29, 2019

(86) PCT No.: PCT/KR2019/014380
§ 371 (c)(1),
(2) Date: Jun. 8, 2021

(87) PCT Pub. No.: WO2020/091384
PCT Pub. Date: May 7, 2020

(65) Prior Publication Data
US 2022/0090946 A1    Mar. 24, 2022

(30) Foreign Application Priority Data
Oct. 30, 2018  (KR) ........................ 10-2018-0130875

(51) Int. Cl.
*G01F 1/42*      (2006.01)
*G01F 1/44*      (2006.01)
(52) U.S. Cl.
CPC . *G01F 1/42* (2013.01); *G01F 1/44* (2013.01)

(58) Field of Classification Search
None
See application file for complete search history.

(56) References Cited

U.S. PATENT DOCUMENTS

| 4,651,572 A | 3/1987 | Albertz et al. |
| 5,048,327 A | 9/1991 | Atwood |

(Continued)

FOREIGN PATENT DOCUMENTS

| CN | 201463945 U | 5/2010 |
| CN | 204831416 U | 12/2015 |

(Continued)

OTHER PUBLICATIONS

KR Office Action dated Aug. 10, 2019 as received in Application No. 10-2018-0130875.

(Continued)

*Primary Examiner* — Harshad R Patel
(74) *Attorney, Agent, or Firm* — Maschoff Brennan

(57) ABSTRACT

A venturi flowmeter includes a ring of which the inside is hollow and which prevents inner wall abrasion or fatigue load accumulation at a main orifice and thus can reduce maintenance costs. The venturi flowmeter includes a main orifice of which the inside is hollow and an element of which one side has a hollow inside having the same diameter as that of a through-hole of the main orifice, and which has a tapered shape toward the other side thereof. A diffuser has one side having a hollow inside of the same diameter as that of the through-hole of the main orifice, and which has a tapered shape toward the other side thereof. A ring is connected between the main orifice and one side of the element. The ring includes a stopper formed along an inner wall and having a hollow central portion.

1 Claim, 4 Drawing Sheets

(56) References Cited

U.S. PATENT DOCUMENTS

| | | | |
|---|---|---|---|
| 8,429,983 B2* | 4/2013 | Furlong | G01F 1/74 73/861 |
| 2011/0214498 A1* | 9/2011 | Rezgui | G01F 1/44 73/152.29 |
| 2018/0238722 A1 | 8/2018 | Erdler et al. | |

FOREIGN PATENT DOCUMENTS

| | | |
|---|---|---|
| KR | 1020150151211 A | 10/2015 |
| KR | 10-2016-0089850 A | 7/2016 |

OTHER PUBLICATIONS

KR Decision to Grant dated Apr. 7, 2020 as received in Application No. 10-2018-0130875.

* cited by examiner

VENTURI FLOWMETER HAVING A REPLACEABLE TUBE INSERT AND RING ELEMENT INSERTED IN THE MAIN ORIFICE OF THE VENTURI

TECHNICAL FIELD

The present disclosure relates to a flowmeter, and more particularly, to a Venturi flowmeter including a ring having a hollow inside.

BACKGROUND ART

In general, a flowmeter is a device capable of measuring a flow rate and is classified into various types of flowmeters such as a differential pressure flowmeter, a variable area flowmeter, an electronic flowmeter, an ultrasonic flowmeter, a turbine flowmeter, a positive displacement flowmeter, and a vortex flowmeter.

The differential pressure flowmeter, which is most widely used among the flowmeters, is reclassified into a Venturi flowmeter, an orifice flowmeter, a nozzle type flowmeter, a pitot tube flowmeter, and the like.

In particular, the Venturi flowmeter is a flowmeter configured to calculate a flow rate by measuring a differential pressure according to flow of a fluid in a Venturi pipe installed in a flow channel to cause a pressure change. The structure of the Venturi flowmeter may be seen from FIG. 1.

However, as shown in FIG. 1, while the fluid flows from an inlet ① to an outlet ③, the fluid passes through a contracted portion ② of the flow channel, which has a smaller diameter. As the fluid constantly flows from the inlet ① having a larger diameter to the contracted portion ② having a smaller diameter, the inner wall of the contracted portion ② is worn out.

In addition, when the flowmeter is used for a long time, water scale and the like are formed on the inner wall of contracted portion ②, and thus measurement accuracy is degraded when a differential pressure generated according to flow of fluid is measured.

DISCLOSURE

Technical Problem

Therefore, the present disclosure has been made in view of the above problems, and it is one object of the present disclosure to provide a Venturi flowmeter that includes a ring having a hollow inside and is capable of minimizing influence that wear of an inner wall of a main orifice or formation of water scale or the like on the inner wall has on accuracy, thereby improving the accuracy of measurement of a differential pressure generated according to flow of a fluid and reducing maintenance costs.

Technical Solution

In accordance with one aspect of the present disclosure, provided is a Venturi flowmeter 1000 including a main orifice 100 having a hollow inside, an element 200 penetrated to have the same diameter as a through hole of the main orifice 100 on one side thereof, the element 200 having a tapered shape with respect to an opposite side thereof, a diffuser 300 penetrated to have the same diameter as the through hole of the main orifice 100 on one side thereof, the diffuser 300 having a tapered shape with respect to an opposite side thereof, and a ring 400 connected between the main orifice 100 and the one side of the element 200, wherein the ring 400 includes a stopper 410 formed along an inner wall thereof, the stopper 410 having a penetrated central portion.

In the Venturi flowmeter 1000 according to another embodiment of the present disclosure, a tube 500 may be inserted into the through hole of the main orifice 100 on a side facing the element 200.

Advantageous Effects

The present disclosure may provide a Venturi flowmeter with a hollow ring that is capable of improving measurement accuracy of a differential pressure caused by flow of a fluid and reducing maintenance costs by minimizing an influence that wear of an inner wall of a main orifice or generation of water scale or the like on the inner wall has on the accuracy.

BEST MODE

Hereinafter, exemplary embodiments of the present disclosure will be described in detail with reference to the accompanying drawings.

Figure 1:
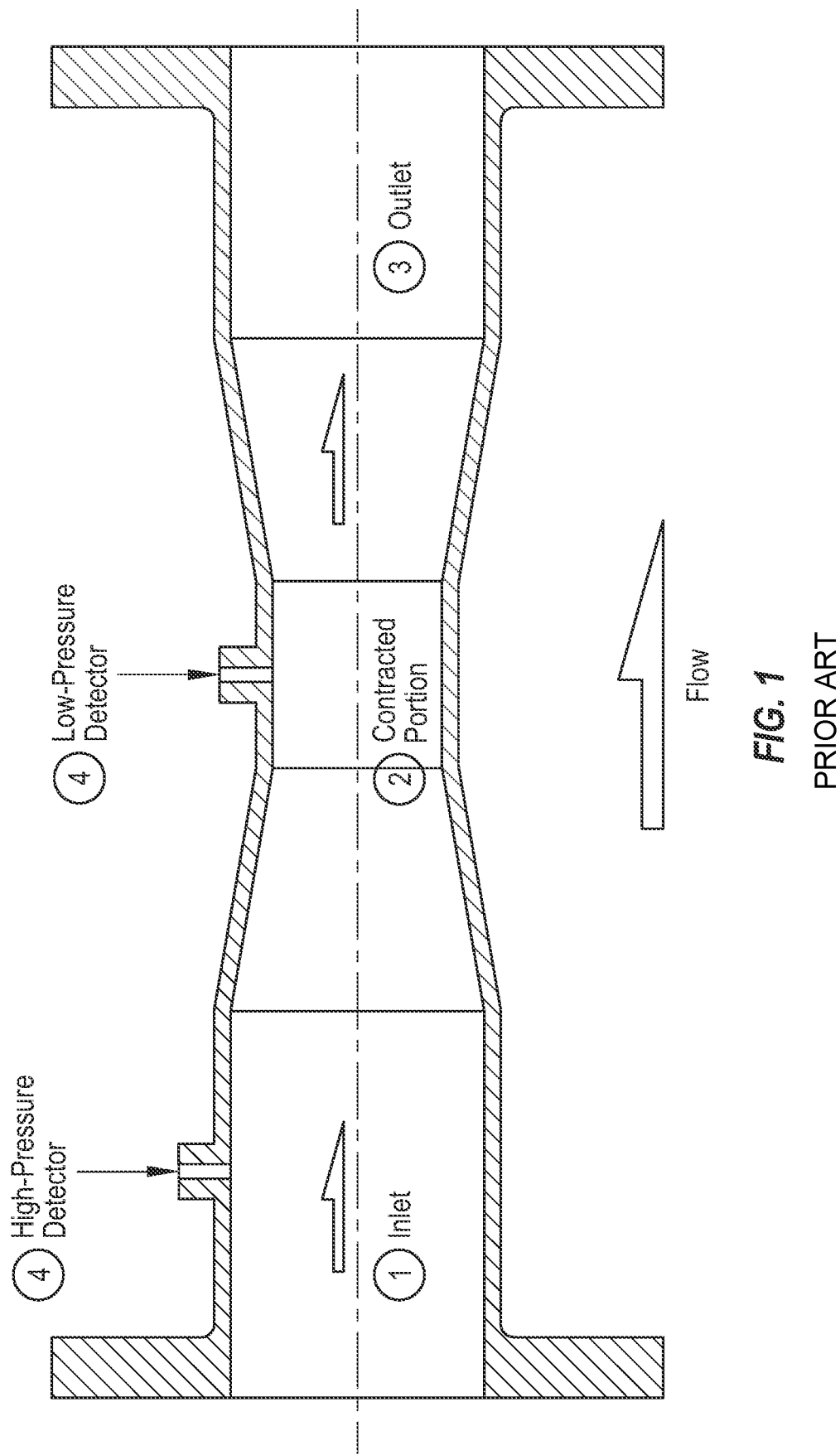
FIG. 1 is a diagram showing a structure of a conventional Venturi flowmeter.
Figure 2:
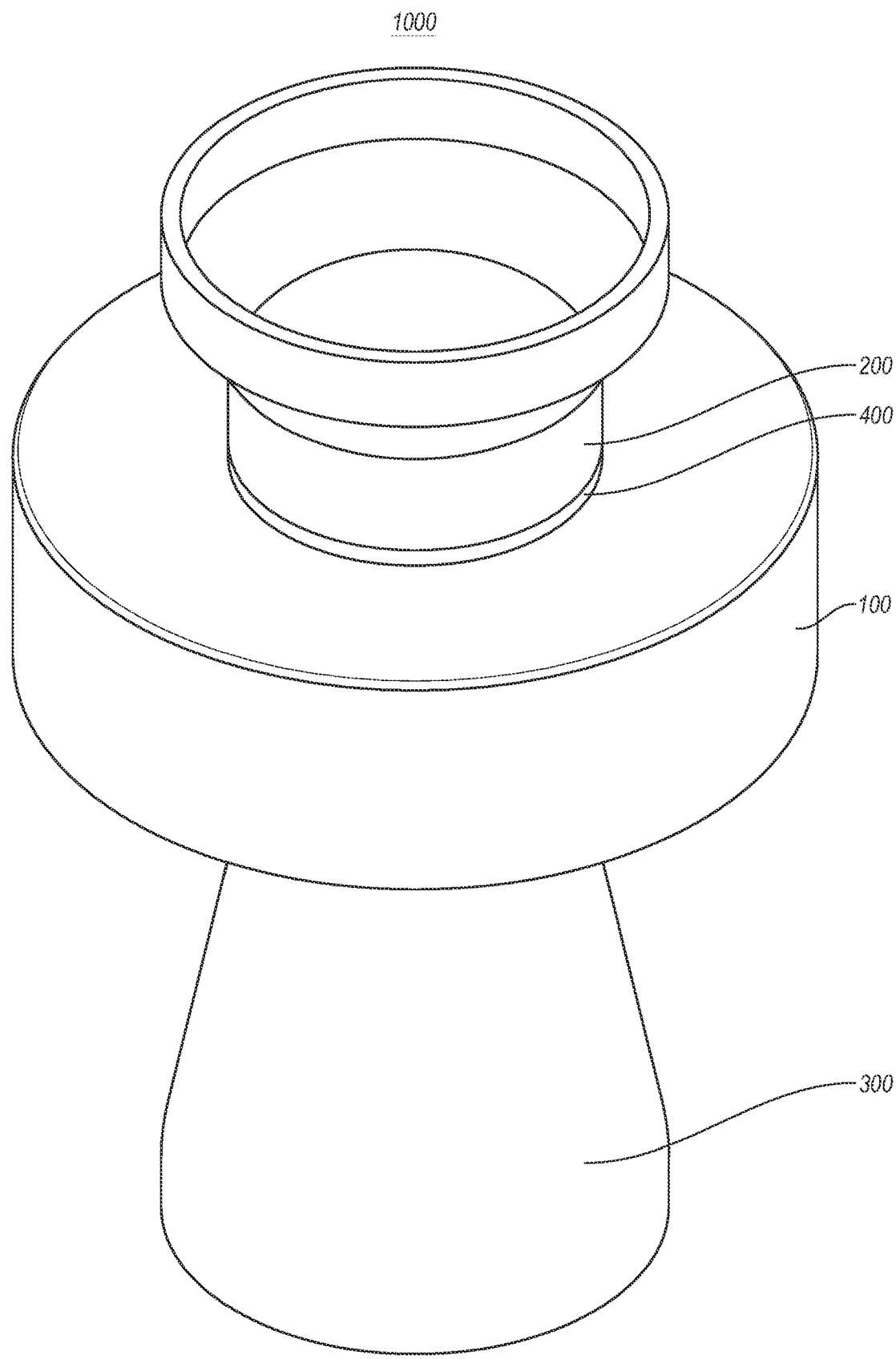
FIG. 2 is a perspective view showing a configuration of the assembly of a Venturi flowmeter according to an embodiment of the present disclosure.
Figure 3:
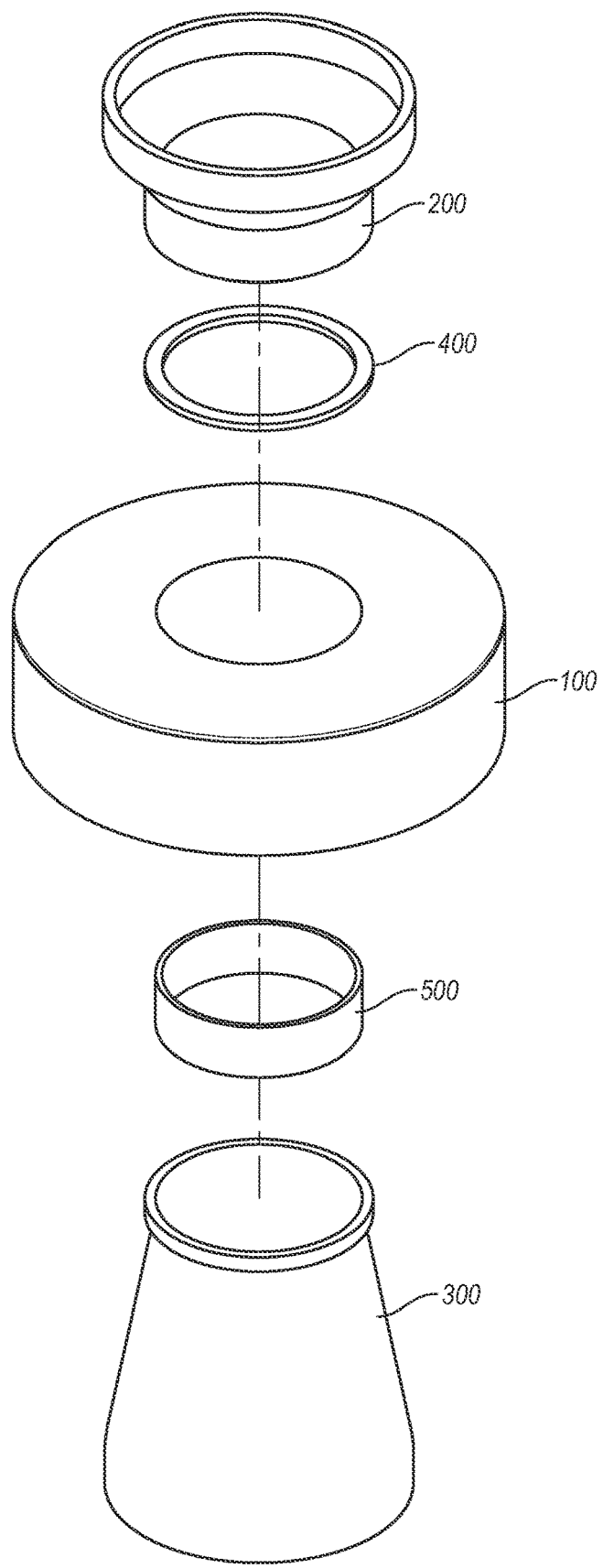
FIG. 3 is an exploded perspective view showing the configuration of the Venturi flowmeter according to an embodiment of the present disclosure.

FIG. 2 is a perspective view showing a configuration of the assembly of a Venturi flowmeter according to an embodiment of the present disclosure, and FIG. 3 is an exploded perspective view showing the configuration of the Venturi flowmeter according to an embodiment of the present disclosure.

Referring to FIGS. 2 and 3, a Venturi flowmeter 1000 according to an embodiment of the present disclosure may include a main orifice 100, an element 200, a diffuser 300, and a ring 400.

According to the present embodiment, the main orifice 100 is described as being formed in the shape of a hollow cylinder for ease of description. However, embodiments are not limited thereto. The main orifice 100 may be formed in various shapes capable of performing the function of the Venturi flowmeter 1000.

The element 200 is penetrated to have the same diameter as a through hole of the main orifice 100 on one side, and has a tapered shape with respect to an opposite side.

The diffuser 300 is penetrated to have the same diameter as the through hole of the main orifice 100 on one side and has a tapered shape with respect to the opposite side.

Here, the main orifice 100, the element 200, and the diffuser 300 may be connected to each other using various methods such as bolting, welding, or flange coupling.

The structure of the Venturi pipe may be formed by the main orifice 100, the element 200, and the diffuser 300 configured as described above.

That is, in the Venturi flowmeter 1000, which is a differential pressure flowmeter, the element 200 functions as an inlet of a fluid, the main orifice 100 functions as a contracted portion, and the diffuser 300 functions as an outlet of the fluid.

As the fluid passes through the main orifice 100 and the diffuser 300 from the element 200, the velocity of the fluid in the main orifice 100 is higher than in the element 200, and the pressure in the main orifice 100 is lower than in the element 200.

Based on this principle, a differential pressure between a high-pressure detector of the element 200 and a low-pressure detector of the main orifice 100 may be measured to calculate a flow rate.

In this case, the fluid flowing from the element 200 to the main orifice 100 may persistently cause wear of the inner wall of the main orifice 100 as the velocity of the fluid increases.

As time elapses, water scale or the like may be formed on the inner wall of the main orifice 100 by impurities in the fluid.

The Venturi flowmeter 1000 may be formed of a material with high durability so as to have a large size, and accordingly the installation cost and maintenance cost thereof may be very high.

Accordingly, in order to prevent an error from increasing due to wear of the inner wall of the main orifice 100 or formation of mosses, water scale, or the like on the inner wall when the Venturi flowmeter 1000 is installed, the Venturi flowmeter 1000 according to an embodiment of the present disclosure may include the ring 400, which is connected between the main orifice 100 and one side of the element 200. The structure of the ring 400 will be described below with reference to FIG. 4.

Figure 4:
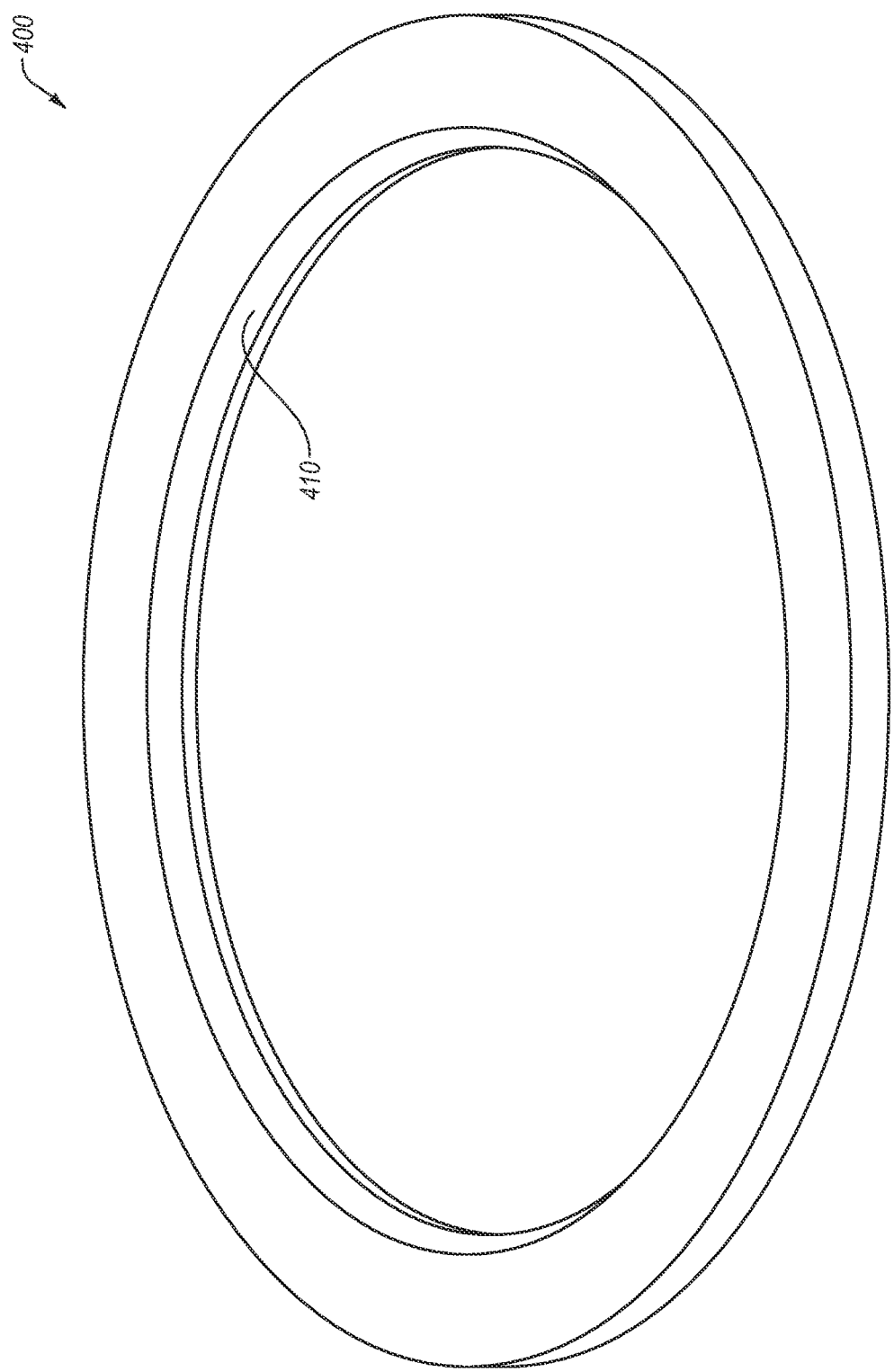
FIG. 4 is a perspective view showing the structure of a ring included in the Venturi flowmeter according to an embodiment of the present disclosure.

FIG. 4 is a perspective view showing the structure of a ring included in the Venturi flowmeter according to an embodiment of the present disclosure.

Referring to FIG. 4, the ring 400 included in the Venturi flowmeter 1000 according to an embodiment of the present disclosure may have a vertically penetrated hollow shape.

The ring 400 may include a stopper 410 formed along an inner wall thereof and having a penetrated central portion.

The ring 400 is very similar in shape to an orifice flowmeter.

As such, the Venturi flowmeter 1000 according to an embodiment of the present disclosure includes the ring 400 connected between the main orifice 100 and one side of the element 200. Thereby, an error caused by wear of the inner wall of the main orifice 100 or formation of mosses, water scale, or the like on the inner wall may be prevented.

That is, when the fluid passes through the main orifice 100 from the element 200, an error occurs in the fluid having an increased velocity due to the inner wall of the main orifice 100. As the ring 400 having the shape of the orifice is added, the ring 400 becomes the main part of fluid resistance.

Accordingly, increase in measurement error produced by wear of the neck portion of the inner wall of the main orifice 100 or water scale formed thereon by accumulation of impurities may be minimized.

Wear of the inner wall may occur. In this case, only the ring 400 needs to be replaced, rather than replacing the entire Venturi flowmeter 1000 in the case of an integrated type Venturi flowmeter or replacing the main orifice 100 in the case of a separable type Venturi flowmeter 1000. Thereby, manufacturing costs and maintenance costs of the Venturi flowmeter 1000 may be reduced.

In the Venturi flowmeter 1000 according to an embodiment of the present disclosure, a hollow tube 500 is inserted into the through hole of the main orifice 100 on the side facing the element 200.

That is, the tube 500 inserted into the through hole of the main orifice 100 may be brought into contact with the ring 400.

A width between inner and outer diameters of the tube 500 may be approximately similar to the width of the stopper 410 of the ring 400.

The tube 500 may serve to protect the inner wall of the main orifice 100.

That is, the tube 500 may minimize increase in error when water scale or the like is formed on the inner wall of the neck portion of the main orifice 100. When the inner wall of the main orifice 100 is worn out or water scale or the like is formed on the inner wall of the tube 500, only the tube needs to be replaced with an inexpensive tube 500.

Since the Venturi flowmeter 1000 including the ring 400 and the tube 500 which are formed of a strong material is installed, rather than employing the main orifice 100 entirely formed of an expensive and highly durable material for the Venturi flowmeter 1000, not all the parts of the Venturi flowmeter 1000 need to be formed of a strong material. Accordingly, the cost for replacement as well as installation and maintenance costs may be reduced.

The above description is merely illustrative of the technical idea of the present disclosure, and those skilled in the art will appreciate that various modifications and changes are possible, without departing from the idea and scope of the invention. Accordingly, the embodiments disclosed in the present disclosure are not intended to limit the technical idea of the present disclosure, but to explain the technical idea, and the scope of the technical idea of the present disclosure is not limited by these embodiments. The scope of the present disclosure should be interpreted by the accompanying claims, and all technical ideas within the scope equivalent thereto should be construed as being included in the scope of the present disclosure.

The invention claimed is:

1. A Venturi flowmeter comprising:
   a main orifice having a hollow inside;
   an element penetrated to have the same diameter as a through hole of the main orifice on one side thereof, the element having a tapered shape with respect to an opposite side thereof;
   a diffuser penetrated to have the same diameter as the through hole of the main orifice on one side thereof, the diffuser having a tapered shape with respect to an opposite side thereof; and
   a replaceable and durable ring connected between the main orifice and the one side of the element,
   wherein:
   the ring includes a stopper formed along an inner wall thereof, the stopper having a penetrated central portion, and
   a replaceable and durable tube is inserted into the through hole of the main orifice on a side facing the element.

* * * * *